US006560630B1

United States Patent
Vepa et al.

(10) Patent No.: US 6,560,630 B1
(45) Date of Patent: May 6, 2003

(54) RECEIVE LOAD BALANCING AND FAIL OVER WITH MULTIPLE NETWORK INTERFACE CARDS

(75) Inventors: RamKrishna Vepa, Danville, CA (US); Roman G. Baker, San Jose, CA (US); Sameer Nanda, Sunnyvale, CA (US); Thomas A. Maufer, Santa Clara, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/272,695

(22) Filed: Mar. 18, 1999

(51) Int. Cl.[7] .................................................. G06F 9/00
(52) U.S. Cl. ........................................ 709/105; 709/250
(58) Field of Search .............................. 709/105, 250, 709/220, 223–224, 235, 238

(56) References Cited

U.S. PATENT DOCUMENTS

| 5,774,660 | A | * | 6/1998 | Brendel et al. ............. 709/105 |
|---|---|---|---|---|
| 5,918,021 | A | * | 6/1999 | Aditya ........................ 709/235 |
| 6,208,616 | B1 | * | 3/2001 | Mahalingam et al. ....... 370/216 |
| 6,243,360 | B1 | * | 6/2001 | Basilico ..................... 709/250 |
| 6,253,334 | B1 | * | 6/2001 | Amdahl et al. ............. 709/105 |
| 6,381,218 | B1 | * | 4/2002 | McIntyre et al. ........... 370/245 |
| 6,393,483 | B1 | * | 5/2002 | Latif et al. .................. 709/226 |
| 6,424,621 | B1 | * | 7/2002 | Ramaswamy et al. ...... 709/105 |

* cited by examiner

Primary Examiner—Ayaz Sheikh
Assistant Examiner—Philip B. Tran
(74) Attorney, Agent, or Firm—Wagner, Murabito & Hao LLP

(57) ABSTRACT

A method for load balancing incoming data packets in a server computer system adapted to have a plurality of network interface cards coupled thereto and communicatively coupled to client computer systems in a network. A first media access control (MAC) address for a first NIC is selected using a load balancing scheme. A first directed data packet containing the first MAC address and a network address for the server computer system is sent to a first client computer system. The first MAC address and the network address are stored in a protocol cache of the first client computer system. A second MAC address for a second NIC is also selected using the load balancing scheme. A second directed packet containing the second MAC address and the network address is sent to a second client computer system. The second MAC address and the network address are stored in a protocol cache of the second client computer system. Thus, the server computer system will receive an incoming data packet from the first client computer system over the first NIC and from the second computer system over the second NIC.

23 Claims, 14 Drawing Sheets

300a

| NETWORK ADDRESS | MAC ADDRESS |
|---|---|
| SERVER NETWORK ADDRESS | SERVER MAC ADDRESS |
| ... | ... |
| ... | ... |

| NETWORK ADDRESS | MAC ADDRESS |
|---|---|
| CLIENT NETWORK ADDRESS | CLIENT MAC ADDRESS |
| ... | ... |
| ... | ... |

| DESTINATION ADDRESS | SOURCE ADDRESS | TYPE | TARGET NETWORK ADDRESS | TARGET MAC | SOURCE NETWORK ADDRESS 416 | SOURCE MAC ADDRESS 417 |
|---|---|---|---|---|---|---|

| NETWORK ADDRESS | MAC ADDRESS |
|---|---|
| SERVER NETWORK ADDRESS (e.g., Server IP Address) ... ... | MAC ADDRESS for NIC 108a ... ... |

670

| NETWORK ADDRESS | MAC ADDRESS |
|---|---|
| SERVER NETWORK ADDRESS (e.g., Server IP Address) ... ... | MAC ADDRESS for NIC 108b ... ... |

| NETWORK ADDRESS | MAC ADDRESS |
|---|---|
| ALIAS SERVER NETWORK ADDRESS (e.g., CSIP) | MAC ADDRESS for Primary MAC |
| SERVER NETWORK ADDRESS (e.g., Server IP Address) (Actual) ... ... | MAC ADDRESS for NIC 108a ... ... |

770

| NETWORK ADDRESS | MAC ADDRESS |
|---|---|
| ALIAS SERVER NETWORK ADDRESS (e.g., CSIP) | MAC ADDRESS for Primary MAC |
| SERVER NETWORK ADDRESS (e.g., Server IP Address) (Actual) ... ... | MAC ADDRESS for NIC 108b ... ... |

FIG. 7B

RECEIVE LOAD BALANCING AND FAIL OVER WITH MULTIPLE NETWORK INTERFACE CARDS

TECHNICAL FIELD

The present invention relates to the field of computer system networks. In particular, the present invention pertains to a software-based module for augmenting a server computer system to perform network interface card load balancing for incoming data packets.

BACKGROUND ART

Computer systems linked to each other in a network are commonly used in businesses and other organizations. Computer system networks ("networks") provide a number of benefits for the user, such as increased productivity, flexibility, and convenience as well as resource sharing and allocation.

Networks are configured in different ways depending on implementation specific details such as the hardware used and the physical location of the equipment, and also depending on the particular objectives of the network. In general, networks include one or more server computer systems, each communicatively coupled to numerous client computer systems.

In contemporary networks, server computer systems are typically coupled to the network using more than one network interface card (NIC). Multiple NICs increase the total available bandwidth capacity for transmitting and sending data packets. Multiple NICs also provide resiliency and redundancy if one of the NICs fails so that the client computer systems in communication with the server computer system through a particular NIC are not cut off from the server should that NIC fail.

The prior art is problematic because incoming data packets (that is, data packets being received by the server computer system) may not be evenly distributed across the NICs. Thus, one NIC may receive a disproportionate share of the incoming data traffic. Consequently, traffic over that NIC may be slowed, reducing the overall efficiency of the server computer system and hence the network.

For example, in a TCP/IP (Transmission Control Protocol/Internet Protocol) transaction initiated by a server computer system, data packets are transmitted from the server computer system to a client computer system. After a certain number of data packets are transmitted and received, an acknowledgment signal is sent from the client computer system and received by the server system; the number of data packets that can be transmitted between acknowledgments is often referred to as the window size.

NICs typically utilize a duplex configuration so that they can receive and transmit simultaneously. However, as the number of transmissions increase the number of acknowledgment signals also increase, As the number of acknowledgments increase, a bottleneck may occur at a NIC that is seeing a disproportionate share of the incoming data traffic. Consequently, acknowledgment signals arriving over that NIC may be delayed before they reach the server computer system. When the server computer system senses that the acknowledgment signals are not being received in time, the server computer system reduces the size of the window, and so fewer data packets are transmitted between acknowledgments. Thus, the overall performance of the server computer system is reduced.

The prior art is also problematic for transactions initiated from client computer systems. Typically, a client computer system is assigned to a particular NIC on the server computer system. A network may be initially set up so that the incoming traffic from client computer systems is distributed evenly; that is, when the network is established, each NIC is assigned the same number of client computer systems, or perhaps an attempt is made to predict the volume of traffic expected from each client computer system and assign the NICs accordingly. However, over time the distribution of data traffic is likely to change significantly from the initial set of assumptions because the manner and frequency of use of each client computer system will not remain the same. Thus, the prior art is problematic because in time the incoming data traffic received by the server computer system will likely evolve to a state where the traffic is not distributed evenly over the NICs.

In the case of a failure of a NIC, it is desirable to be able to redistribute the traffic handled by that NIC over the remaining functioning NICs. Otherwise, if the traffic from the failed NIC is transferred to a single NIC, that NIC may be handling a disproportionate share of incoming data traffic, resulting in a bottleneck over that NIC and leading to the problems described above.

Accordingly, a need exists for a system and method that balance the load of incoming data packets received by a server computer system that has multiple NICs. What is further needed is a system and method that address the above need when either the server computer system or the client computer system initiates a transaction. What is also needed is a system and method that address the above needs and dynamically adjust the receive load balancing to help maintain an even distribution of incoming data packets across the multiple NICs over time or in the event of a NIC failure.

DISCLOSURE OF THE INVENTION

The present invention provides a system and method that balance the load of incoming data packets received by a server computer system having multiple NICs. The present invention also provides a system and method that address the above need when either the server computer system or the client computer system initiates a transaction. The present invention also provides a system and method that address the above needs and dynamically adjust the receive load balancing to help maintain an even distribution of incoming data packets across the multiple NICs over time or in the event of a NIC failure.

Specifically, in one embodiment, the present invention pertains to a method for load balancing incoming data packets received by a server computer system adapted to have a plurality of network interface cards coupled thereto and communicatively coupled to client computer systems in a network. A first media access control (MAC) address for a first NIC is selected using a load balancing scheme. A first directed data packet containing the first MAC address and a network address for the server computer system is sent to a first client computer system. The first MAC address and the network address are stored in a protocol cache of the first client computer system. A second MAC address for a second NIC is also selected using the load balancing scheme. A second directed packet containing the second MAC address and the network address is sent to a second client computer system. The second MAC address and the network address are stored in a protocol cache of the second client computer system. Thus, the server computer system will receive an incoming data packet from the first client computer system over the first NIC and from the second computer system over the second NIC.

In one embodiment, a broadcast data packet containing an alias network address for the server computer system is sent to the first client computer system. The client computer system responds to the broadcast data packet and provides its network address and MAC address. The server computer system stores this information in protocol cache. A MAC address is selected using the receive load balancing scheme. A directed data packet containing the actual network address of the server computer system and the selected MAC address is sent to the first client computer system as described above.

In one embodiment, when a Transmission Control Protocol (TCP) transaction is initiated between the server computer system and a client computer system, a MAC address is selected using the receive load balancing scheme. Before the TCP is performed, the selected MAC address and the network address of the server computer system are sent to the client computer system in a directed data packet. The client computer system uses the selected MAC address to replace a MAC address previously stored in its protocol cache.

In one embodiment, the receive load balancing scheme is a round-robin approach. The plurality of NICs of the server computer system are arranged in a particular sequence. The receive load balancing scheme selects a MAC address according to the sequence, and repeats the sequence after each MAC is selected.

In one embodiment, the protocol cache of the client computer system and of the server computer system are Address Resolution Protocol (ARP) caches.

In one embodiment, the directed data packets and the broadcast data packets are compliant with ARP.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 3A and 3B illustrate the data structure of the protocol caches of, respectively, a client computer system and a server computer system in accordance with one embodiment of the present invention.

FIG. 4 illustrates one embodiment of a data packet used for transmitting address information in accordance with the present invention.

FIG. 6B illustrates the contents of a client computer system cache memory for the process of FIG. 6A in accordance with one embodiment of the present invention.

FIG. 7B illustrates the contents of a client computer system cache memory for the process of FIG. 7A in accordance with one embodiment of the present invention.

BEST MODE FOR CARRYING OUT THE INVENTION

Figure 1:
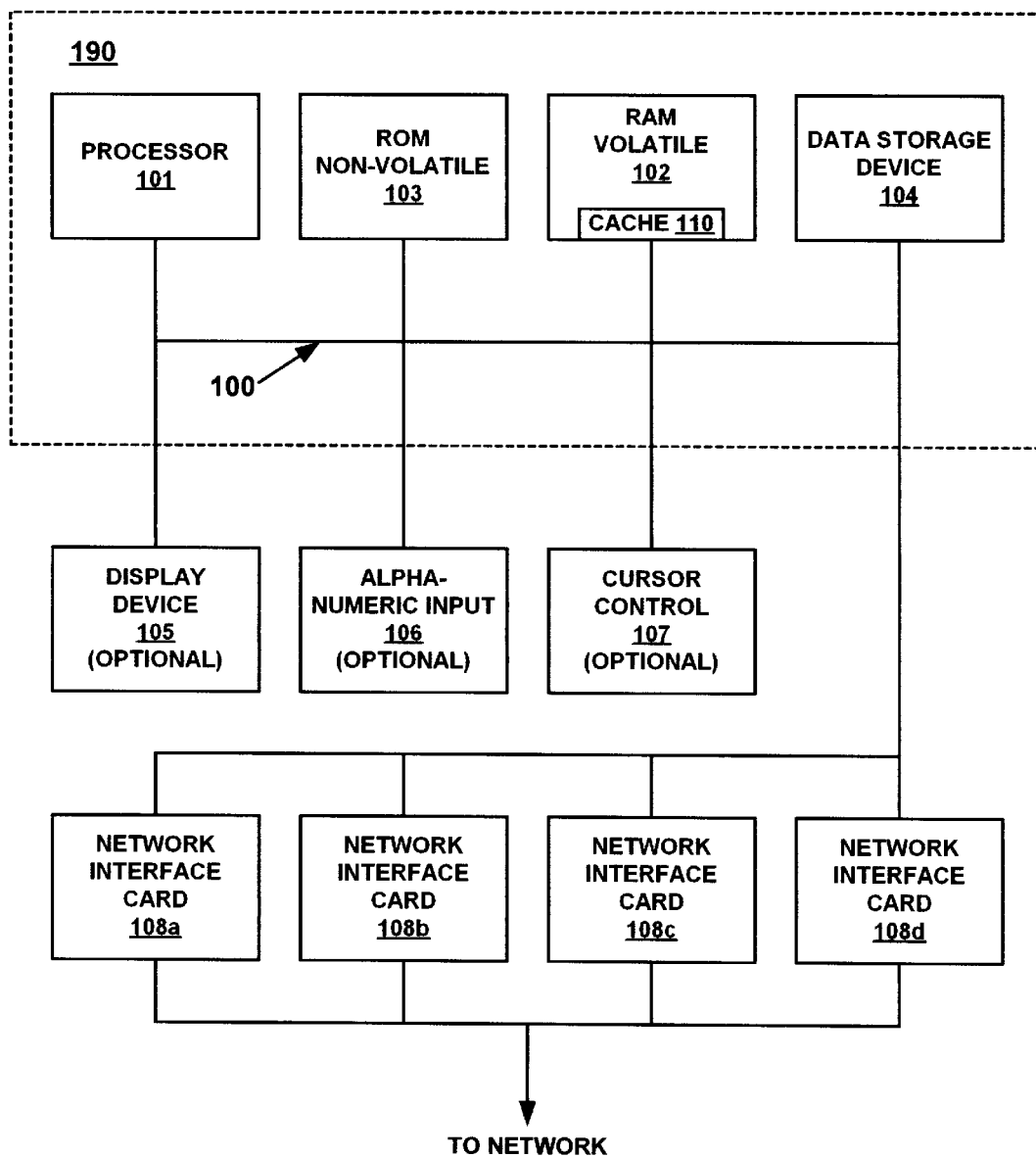
FIG. 1 shows a general purpose server computer system upon which embodiments of the present invention may be implemented.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, 10 numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "selecting" or "associating" or "storing" or "reading" or "sending" or "initiating" or "replacing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention pertains to a method for load balancing incoming data packets received by a server computer system adapted to have a plurality of network interface cards coupled thereto and communicatively coupled to client computer systems in a network. The present invention is discussed in the context of Internet Protocol, Transmission Control Protocol, and Address Resolution Protocol, although it is understood that other protocols (current and proposed) may be utilized in accordance with the present invention.

Refer to FIG. 1 which illustrates an exemplary server computer system 190 upon which embodiments of the present invention may be practiced. Server computer system 190 is communicatively coupled to other computer systems (not shown) in a network.

In general, server computer system 190 used by the embodiments of the present invention comprises a bus 100 for communicating information, a central processor 101 coupled with bus 100 for processing information and instructions, a random access memory 102 coupled with bus 100 for storing information and instructions for central processor 101, a read-only memory 103 coupled with bus 100 for storing static information and instructions for central processor 101, a data storage device 104 such as a magnetic or optical disk and disk drive coupled with bus 100 for storing information and instructions, an optional display device 105 coupled to bus 100 for displaying information to the computer user, an optional alphanumeric input device 106 including alphanumeric and function keys coupled to bus 100 for communicating information and command selections to central processor 101, and an optional cursor control device 107 coupled to bus 100 for communicating user input information and command selections to central processor 101.

Display device 105 of FIG. 1 utilized with server computer system 190 of the present embodiment may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control device 107 also may be directed and/or activated via input from the keyboard using special keys and key sequence commands. Alternatively, the cursor may be directed and/or activated via input from a number of specially adapted cursor directing devices.

Continuing with reference to FIG. 1, server computer system 190 is adapted to be coupled via bus 100 to a plurality of network interface cards (NICs) exemplified by NICs 108a, 108b, 108c and 108d. NICs 108a-d provide the physical link to communicatively couple server computer system 190 to a to network of client computer systems and other server computer systems (not shown). Any of a number of different and well known types of NICs may be used to communicate with the network of client and server computer systems. It is appreciated that any number of NICs may be utilized in accordance with the present invention. It is further appreciated that NICs 108a-d may be integrated into server computer system 190 or they may be externally coupled to server computer system 190. Each of NICs 108a-d has a unique media access control (MAC) address.

Server computer system 190 also includes a cache 110. In one embodiment, cache 110 is included in random access memory 102 although it may be otherwise implemented in accordance with the present invention. Cache 110 is used to affiliate a network address (e.g., an Internet Protocol address, an Internetwork Protocol Exchange address, etc.) with the unique MAC address for a particular NIC. Thus, cache 110 is used by server computer system 190 to provide both the network address and the MAC address for a desired destination, such as NIC 208 of client computer system 290 of FIG. 2. In one embodiment, cache 110 is a protocol cache such as an Address Resolution Protocol (ARP) cache.

Figure 2:
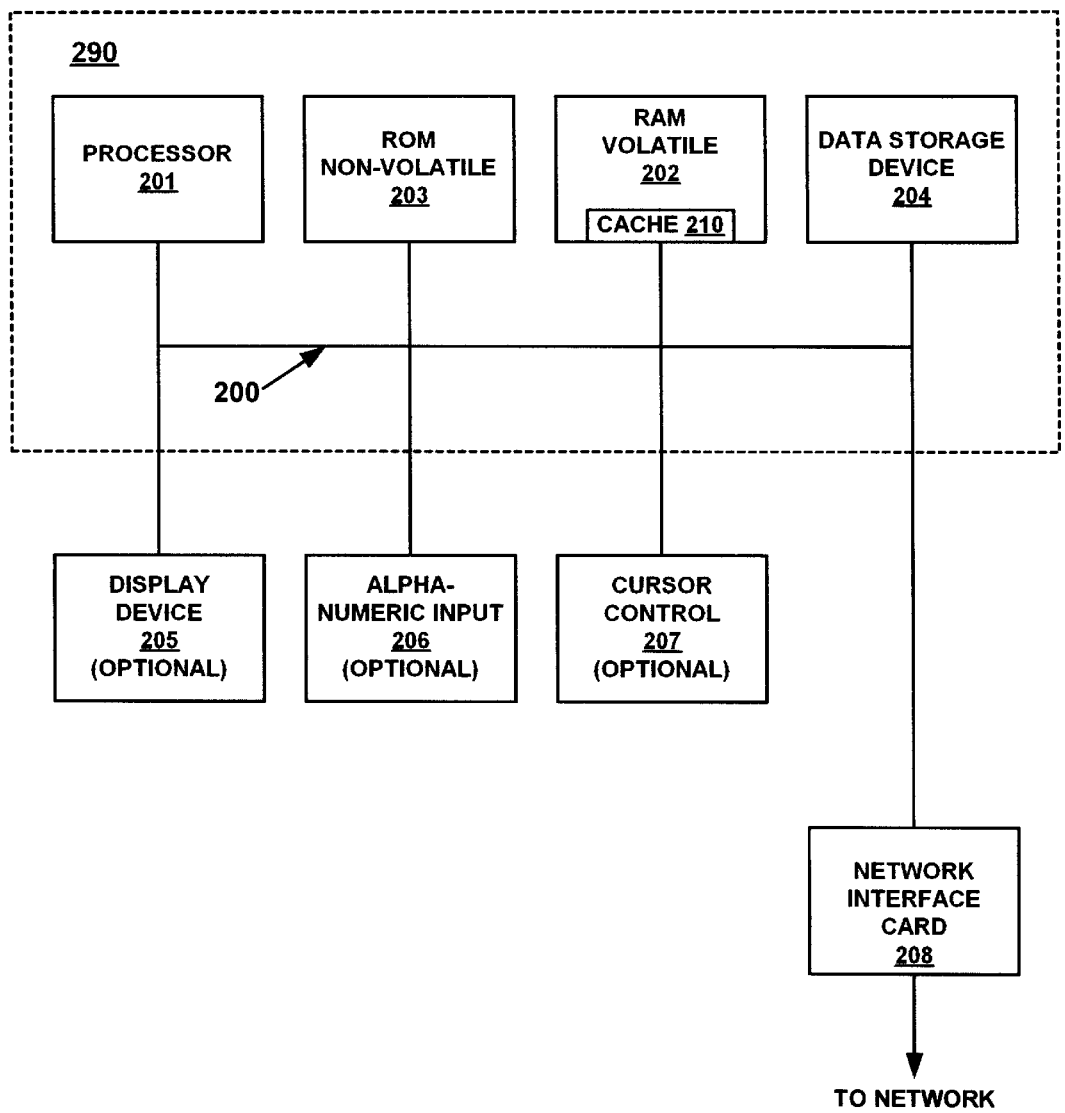
FIG. 2 shows a general purpose client computer system upon which embodiments of the present invention may be implemented.

FIG. 2 illustrates an exemplary client computer system 290 upon which embodiments of the present invention may be practiced. Client computer system 290 is communicatively coupled to other computer systems (not shown) in a network. In general, bus 200, processor 201, random access memory 202, read-only memory 203, data storage device 204, optional display device 205, optional alphanumeric input device 206, optional cursor control device 207, and display device 205 are as described in conjunction with FIG. 1.

Client computer system 290 also includes a cache 210. In the present embodiment, cache 210 is included in random access memory 202 although it may be otherwise implemented in accordance with the present invention. Cache 210 is used to affiliate a network address (e.g., an Internet Protocol address, an Internetwork Protocol Exchange address, etc.) with the unique MAC address for a particular NIC. Thus, cache 210 is used by client computer system 290 to provide both the network address and the MAC address for a desired destination, such as NIC 108a of server computer system 190. In one embodiment, cache 210 is a protocol cache such as an ARP cache.

Client computer system 290 typically utilizes a single NIC (e.g., NIC 208). NIC 208 is used to communicatively couple client computer system 290 to a computer system network (not shown) comprised of one or more server computer systems and other client computer systems.

FIGS. 3A and 3B each illustrate one embodiment of protocol cache 300a and 300b (e.g., ARP caches) that are used by, respectively, client computer systems and server computer systems in accordance with the present invention. In the present embodiment, protocol caches 300a and 300b are represented as a table in which a MAC address is provided as a function of a network address; thus, protocol caches 300a and 300b can be used to determine the MAC address for a particular node on the network when only the network address for that node is known. One entry is shown in each of protocol caches 300a and 300b although it is understood that protocol caches 300a and 300b may contain any number of entries.

As described above, server computer system 190 (FIG. 1) has multiple NICs, each with its own unique MAC address.

In client computer system 290, protocol cache 300a is used to associate the MAC address for one of the NICs (e.g., NIC 108a of FIG. 1) with the network address for server computer system 190. Protocol cache 300a in client computer system 290 can be subsequently changed to associate the MAC address for a different NIC (e.g., NIC 108b) with the same network address. As will be seen, when the present invention receive load balancing scheme is applied, the server computer system's MAC address that is assigned to a particular client computer system may change in order to maintain an even distribution of incoming data packets received by the server computer system. Accordingly, protocol cache 300a of client computer system 290 is readily and automatically updated so that the new MAC address is associated with the network address for server computer system 190, and thus client computer system 290 remains communicatively coupled to server computer system 190. Additional details are provided in conjunction with FIGS. 6A and 7A.

FIG. 4 illustrates one embodiment of address data packet 400 used to provide address information (e.g., a network address such as an Internet Protocol address and a MAC address) to either server computer system 190 or client computer system 290 (FIGS. 1 and 2, respectively). In the present embodiment, address data packet 400 is compliant with Address Resolution Protocol (ARP). Source network address 416 is the network address (e.g., the Internet Protocol address) for either server computer system 190 or for client computer system 290, depending on which computer system is sending the message. In the present embodiment, source MAC 417 is the MAC address for the NIC associated with network address 416; that is, network address 416 and source MAC 417 together provide the address information for a first computer system that is to be used by a second computer system to send a data packet to the first computer system.

Figure 5:
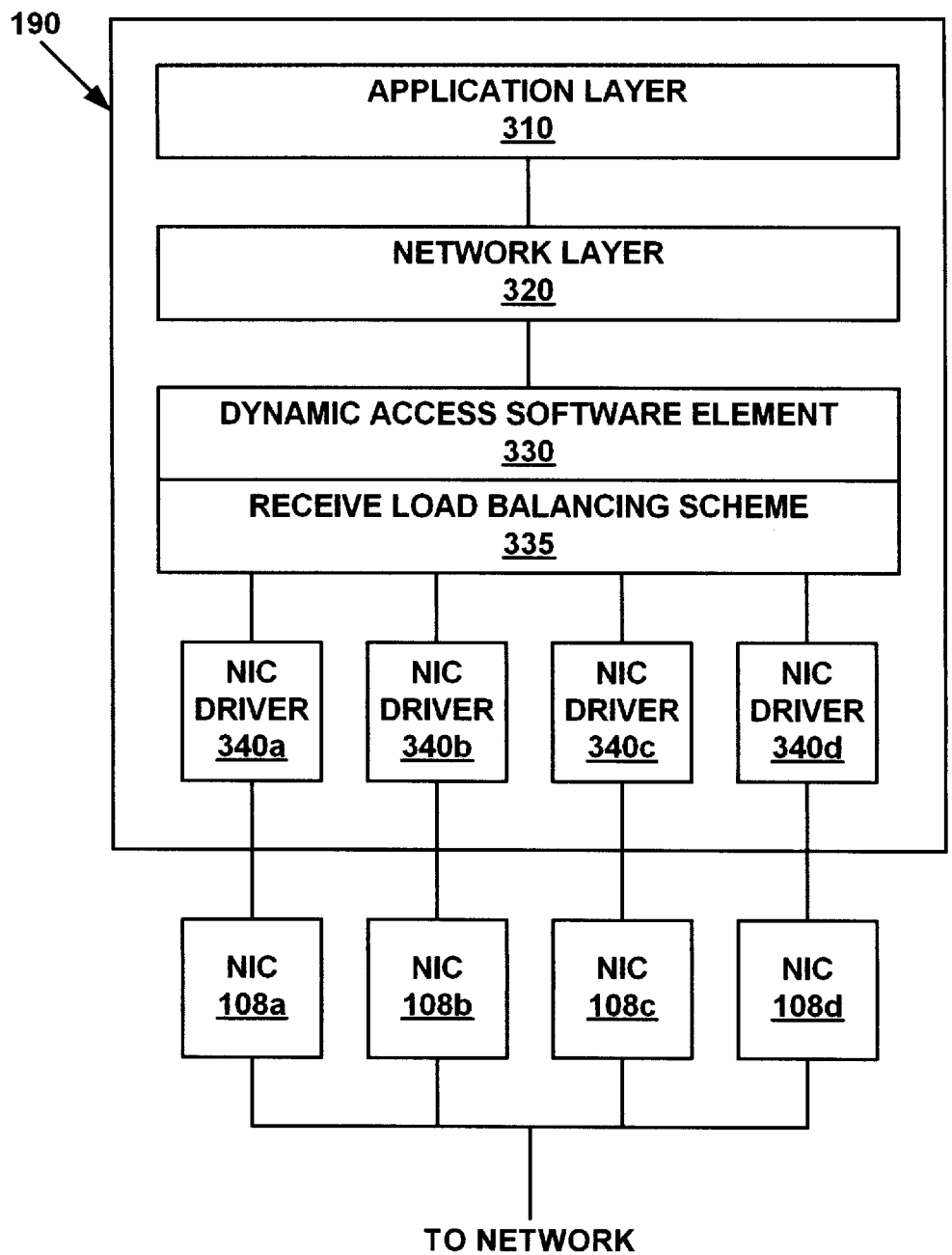
FIG. 5 is a hardware and software data flow diagram of the logical components of the server computer system of FIG. 1 in accordance with one embodiment of the present invention.

FIG. 5 is a hardware and software data flow diagram of the logical components of server computer system 190 in accordance with one embodiment of the present invention. In the present embodiment, application layer 310 and network layer 320 are software elements having the functions and responsibilities defined by the well-known International Standards Organization/Open System Interconnection (ISO/OSI) reference model; however, it is appreciated that the present invention is not limited to this type of configuration or the ISO/OSI reference model. Application layer 310 and network layer 320 constitute a portion of the software elements in server computer system 190 commonly referred to as the protocol stack; it is understood that for simplicity only the relevant layers of the ISO/OSI reference model are shown in FIG. 5.

In the present embodiment, application layer 310 defines the manner in which application programs (e.g., computer software programs, word processors, database management systems, electronic mail, and the like) interact with the communication network. Network layer 320 contains the computer-to-computer or computer-to-network protocol that defines the procedures to be followed when data packets are transmitted and received. The protocols used by network layer 320 include, for example, IP (Internet Protocol), IPX (Internetwork Packet Exchange), or other protocols known in the art. Network layer 320 is responsible for determining addresses or for translating hardware addresses to network addresses.

Continuing with reference to FIG. 5, server computer system 190 is adapted to have multiple NICs; for illustration purposes, only four NICs 108a-d are shown, although it is appreciated that any number of NICs may be used in accordance with the present invention. Associated with each of NICs 108a-d are NIC drivers 340a-d, respectively. In the ISO/OSI reference model, NICs 108a-d correspond to the physical layer and NIC drivers 340a-d correspond to the data-link layer. NIC drivers 340a-d provide an interface for the protocols of network layer 320. NIC drivers 340a-d also provide media access control; that is, they provide access to the particular physical encoding and transport scheme used by NICs 108a-d. As described above, NICs 108a-d provide the physical connection to the network.

In the present embodiment, one of NICs 108a-d is selected by the network manager as the "primary NIC." The primary NIC is used to transmit all broadcast and multicast data packets. In this embodiment, the other NICs are referred to as "secondary NICs" and are used to send directed data packets. All NICs 108a-d receive broadcast data packets. A directed data packet is received by the NIC that is represented by the MAC address contained in the incoming data packet.

In the present embodiment, the present invention includes a software element (e.g., receive load balancing scheme 335) introduced into server computer system 190 between network layer 320 and NIC drivers 340a-d. Receive load balancing scheme 335 is used to balance the distribution of incoming data packets received by server computer system 190. Receive load balancing scheme 335 also sends out a broadcast and/or directed message (e.g., address data packet 400 of FIG. 4) that automatically causes the client computer systems on the network (e.g., client computer system 290 of FIG. 2) to update their protocol caches memory (e.g., protocol caches 300a of FIG. 3A) with the MAC address of the NIC that they are to use when communicating with server computer system 190. Additional information is provided in conjunction with FIGS. 6A, 7A and 9.

With reference still to FIG. 5, in one embodiment, receive load balancing scheme 335 is implemented as one module of dynamic access software element 330. In general, dynamic access software element 330 represents a system and method for sending and receiving data packets over a network of computer systems from a server computer system having a plurality of NICs coupled thereto. Dynamic access software element 330 may incorporate features such as load balancing, fault tolerance and fail over support, class of service (for assigning a priority to outgoing data packets), multicast registration, and support of virtual area networks (VLANs) compliant with IEEE standard 802.1Q. It is appreciated that receive load balancing scheme 335 is not limited to implementation with dynamic access software element 330. Additional-information regarding dynamic access software element 330 is provided in conjunction with FIGS. 10 and 11.

Figure 6A:
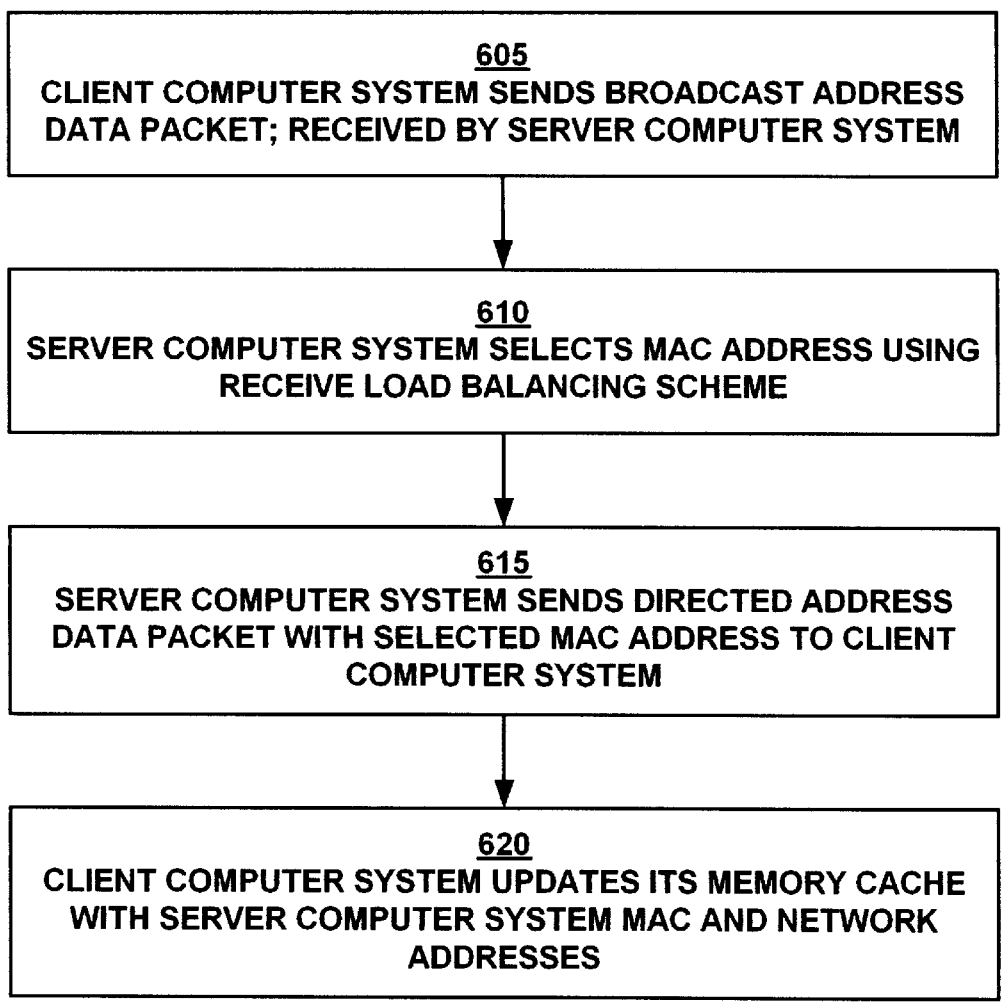
FIG. 6A is a flowchart of one embodiment of the process for implementing receive load balancing in accordance with the present invention for a transaction initiated by a client computer system.

FIG. 6A is a flowchart of process 600 for implementing receive load balancing scheme 335 (FIG. 5) for a transaction initiated by a client computer system (e.g., client computer system 290 of FIG. 2) in accordance with one embodiment of the present invention. In this embodiment, process 600 is implemented via dynamic access software element 330 (FIG. 5).

In step 605 of FIG. 6A, prior to beginning the transaction, client computer system 290 sends a broadcast data packet (e.g., address data packet 400 of FIG. 4) over the network. In the present embodiment, the broadcast data packet is an ARP data packet. The broadcast data packet contains the network address (e.g., the IP address) of server computer system 190. Client computer system 290 is aware of the network address for server computer system 190 through well known methods such as Dynamic Host Configuration Protocol (DHCP). The broadcast data packet also contains the network address and MAC address for client computer system 290. The broadcast data packet is received by server computer system 190 (FIG. 1). In the present embodiment, server computer system 190 stores the network address and the MAC address for client computer system 290 in the server computer system's protocol cache (e.g., protocol cache 300b of FIG. 3B).

In step 610 of FIG. 6A, server computer system 190 executes receive load balancing scheme 335 to select the MAC address for one of the NICs coupled to the server computer system (e.g., one of NICs 108a-d). In the resent embodiment, receive load balancing scheme 335 utilizes a round-robin approach to select a MAC address. That is, for a first client computer system, he MAC address for NIC 108a is selected. For a second client computer system, the MAC address for NIC 108b is selected. Receive load balancing scheme 335 continues in this manner until NICs 108a-d are each assigned to a client computer system. Should another client computer system require a MAC address, the sequence is begun again and repeated continuously; that is, the MAC address for NIC 108a is selected again. In this manner, the MAC addresses for each of the NICs coupled to server computer system 190 are evenly distributed among the client computer systems that are communicatively coupled to server computer system 190.

In step 615, using the address information provided by the address data packet sent in step 605, server computer system 190 sends a directed address data packet (e.g., address data packet 400) to client computer system 290. In the present embodiment, the directed address data packet is a directed ARP response packet. Included in the directed ARP response packet are the MAC address for the selected NIC and the network address for server computer system 190.

In step 620, client computer system 290 stores the MAC address for the selected NIC and the network address for server computer system 190 in the client computer system's protocol cache (e.g., protocol cache 300a of FIG. 3A). In protocol cache 300a, the MAC address is associated with the network address so that if the network address is known the MAC address is readily obtained.

FIG. 6B illustrates protocol cache 660 for a first client computer system and protocol cache 670 for a second client computer system in accordance with he present embodiment of the present invention. Protocol cache 660 and protocol cache 670 each contain the network address for server computer system 190; however, associated with that network address are different MAC addresses for different NICs (e.g., NIC 108a and NIC 108b). Protocol cache 660 contains the network address for server computer system 190 and the MAC address for NIC 108a, and protocol cache 670 contains the network address for server computer system 190 and the MAC address for NIC 108b. Thus, when the first client computer system performs a transaction with server computer system 190, it will use the MAC address for NIC 108a, and similarly a transaction from the second client computer system will use the MAC address for NIC 108b. Thus, in accordance with the present invention, the incoming data traffic received by server computer system 190 for a transaction initiated by a client computer system is distributed over each of the NICs coupled to the server computer system.

Figure 7A:
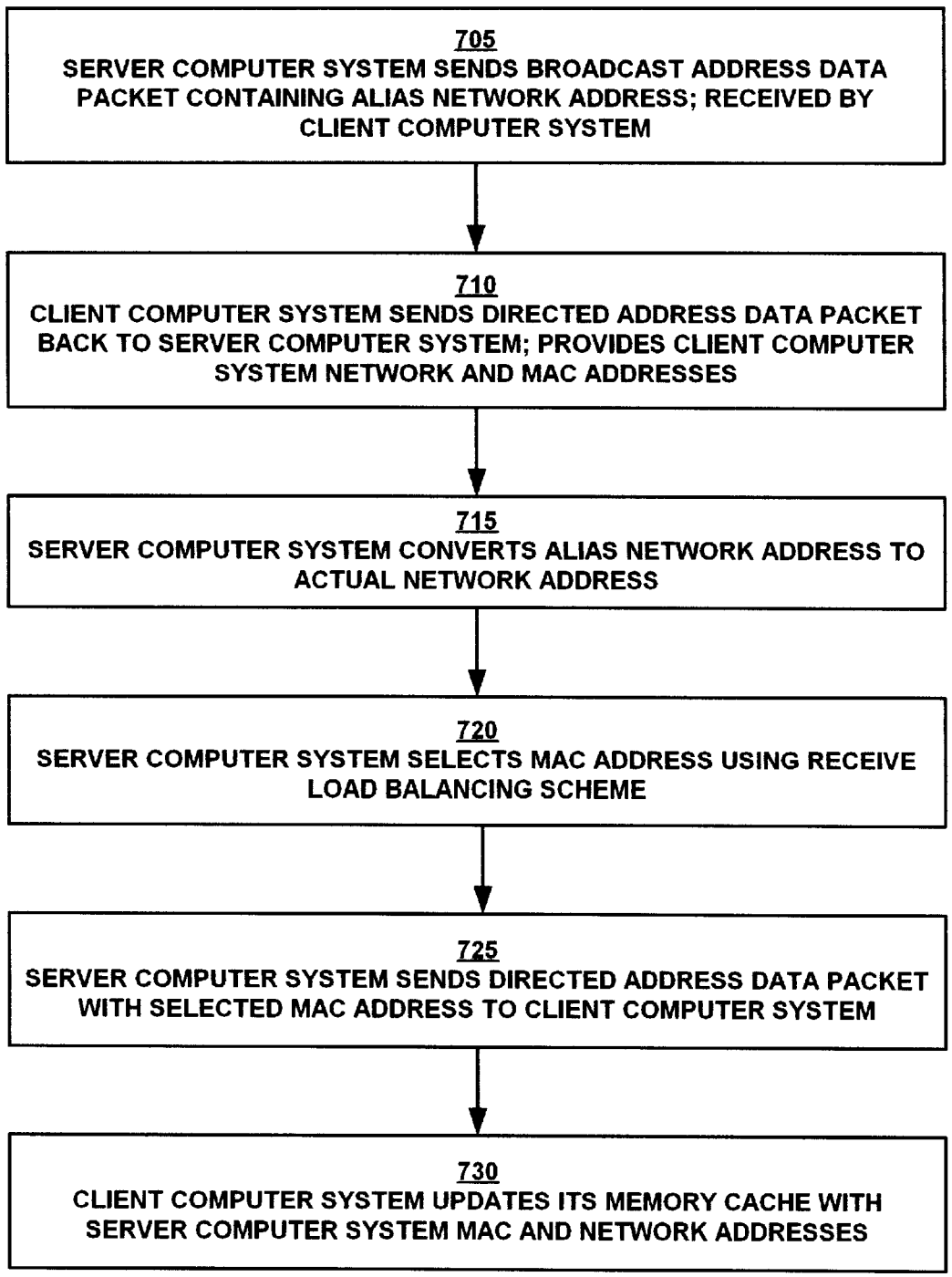
FIG. 7A is a flowchart of one embodiment of the process for implementing receive load balancing in accordance with the present invention for a transaction initiated by a server computer system.

FIG. 7A is a flowchart of process 700 for implementing receive load balancing scheme 335 (FIG. 5) for a transaction initiated by a server computer system (e.g., server computer system 190 of FIG. 1) in accordance with one embodiment of the present invention. In this embodiment, process 700 is implemented via dynamic access software element 330 (FIG. 5).

In step 705, prior to beginning the transaction, server computer system 190 sends a broadcast data packet (e.g., address data packet 400 of FIG. 4) over the network. The broadcast data packet contains the network address (e.g., the IP address) of client computer system 290. Server computer system 190 is aware of the network address for client computer system 290 through well known methods such as the domain name server.

The broadcast data packet also contains a network address and a MAC address for server computer system 190. In accordance with the present invention, at this point in process 700, the network address is an alias network address. In one embodiment, the alias network address is inserted into the broadcast data packet in place of the actual network address by dynamic access software element 330 (FIG. 5).

With reference still to FIG. 7A, in the present embodiment, the alias network address is referred to as the Connection Steering Protocol address or the Connection Steering IP (CSIP) address. In accordance with the present embodiment of the present invention, the CSIP address is similar in format to the network address for server computer system 190. In the present embodiment, the same CSIP address can be used for all server computer systems in the network; the combination of the CSIP address and a MAC address provides a unique address for each server computer system. In one embodiment, a signature uniquely identifying each server computer system on the network is added to the broadcast data packet in order to ensure that the CSIP address corresponds to the correct server computer system.

The alias network address facilitates receive load balancing in accordance with the present invention in the following manner. Because the address data packet transmitted in step 705 by server computer system 190 is a broadcast data packet, it is received by all client computer systems on the network that have an active connection with server computer system 190. Because these other client computer systems already have an active connection with server computer system 190, they have each already reached agreement with server computer system 190 on the network address and MAC address that they will use for server computer system 190. However, even though these other client computer systems are not identified by the broadcast address data packet transmitted in step 705, they will still automatically update their protocol caches (e.g., ARP caches) with the network address and the MAC address provided for server computer system 190 in the broadcast address data packet. By using an alias network address at this point in process 700, the address information already contained in the protocol caches of the other client computer systems will not be overwritten with the new information provided by the broadcast address data packet. Instead, a separate entry is included in the protocol caches of these other client computer systems; the separate entry contains the alias network address and the associated primary MAC address. The protocol caches of the other client computer systems thus retain the network address and corresponding MAC address that they have been using, as well as the alias network address and its corresponding MAC address (see FIG. 7B). The broadcast data packet of step 705 therefore does not interfere with active connections between client computer systems and the server computer system.

Thus, in the present embodiment, at this point in process 700 the MAC address provided in step 705 is the MAC address for the primary NIC (see discussion pertaining to FIG. 5). Client computer system 290 stores the alias network address and the primary MAC address in its protocol cache (e.g., protocol cache 300*a* of FIG. 3A).

In step 710 of FIG. 7A, using the address information provided by the address data packet sent in step 705, client computer system 290 sends a directed address data packet (e.g., address data packet 400) to server computer system 190. In the present embodiment, the directed address data packet is a directed ARP response packet. Client computer system 290 thus uses the alias network address in the directed ARP response packet sent to server computer system 190. Included in the directed ARP response packet sent from client computer system 290 are the MAC address and the network address for the client computer system. In the present embodiment, server computer system 190 stores the MAC address and the network address for client computer system 290 in protocol cache of the server computer system (e.g., protocol cache 300*b* of FIG. 3B).

In step 715 of FIG. 7A, server computer system 190 converts the alias network address from the response sent in step 710 to the actual network address for the server computer system. In one embodiment, the alias network address is converted to the actual network address using dynamic access software element 330 of FIG. 5.

In step 720 of FIG. 7A, server computer system 190 executes receive load balancing scheme 335 to select the MAC address for one of the NICs coupled to the server computer system (e.g., one of NICs 108*a-d*). In the present embodiment, receive load balancing scheme 335 utilizes a round-robin approach to select a MAC address as described above in conjunction with FIG. 6A (step 610). In this manner, the MAC addresses for each of the NICs coupled to server computer system 190 are evenly distributed among the client computer systems that are communicatively coupled to server computer system 190.

In step 725, using the address information provided by the directed address data packet sent in step 710, server computer system 190 sends a directed address data packet (e.g., an ARP response packet) to client computer system 290. This directed ARP response packet is not received by any other client computer system. Included in the directed ARP response packet are the MAC address for the selected NIC and the actual network address for server computer system 190.

In step 730, client computer system 290 stores the MAC address for the selected NIC and the actual network address for server computer system 190 in the protocol cache of the client computer system (e.g., protocol cache 300*a* of FIG. 3A). In protocol cache 300*a*, the MAC address is associated with the network address so that if the network address is known the MAC address is readily obtained.

FIG. 7B illustrates protocol cache 760 for a first client computer system and protocol cache 770 for a second client computer system in accordance with the present embodiment of the present invention. Protocol cache 760 and protocol cache 770 each contain the network address for server computer system 190; however, associated with that network address are different MAC addresses for different NICs (e.g., NIC 108*a* and NIC 108*b*). Protocol cache 760 contains the network address for server computer system 190 and the MAC address for NIC 108*a*, and protocol cache 770 contains the network address for server computer system 190 and the MAC address for NIC 108*b*. Thus, when the first client computer system performs a transaction with server computer system 190, it will use the MAC address for NIC 108*a*, and similarly a transaction from the second client computer system will use the MAC address for NIC 108*b*. Therefore, in accordance with the present invention, the incoming data traffic received by server computer system 190 for a transaction initiated by server computer system 190 is distributed over each of the NiCs coupled to the server computer system.

With reference to FIG. 7B, protocol cache 760 and protocol cache 770 each also contain the alias network address for server computer system 190 and, associated with it, the primary MAC address. However, for transactions with server computer system 190, the client computer systems will use the actual network address for the server computer system and the MAC address for the selected NIC. The alias network address will not be used by the client computer systems.

Figure 8:
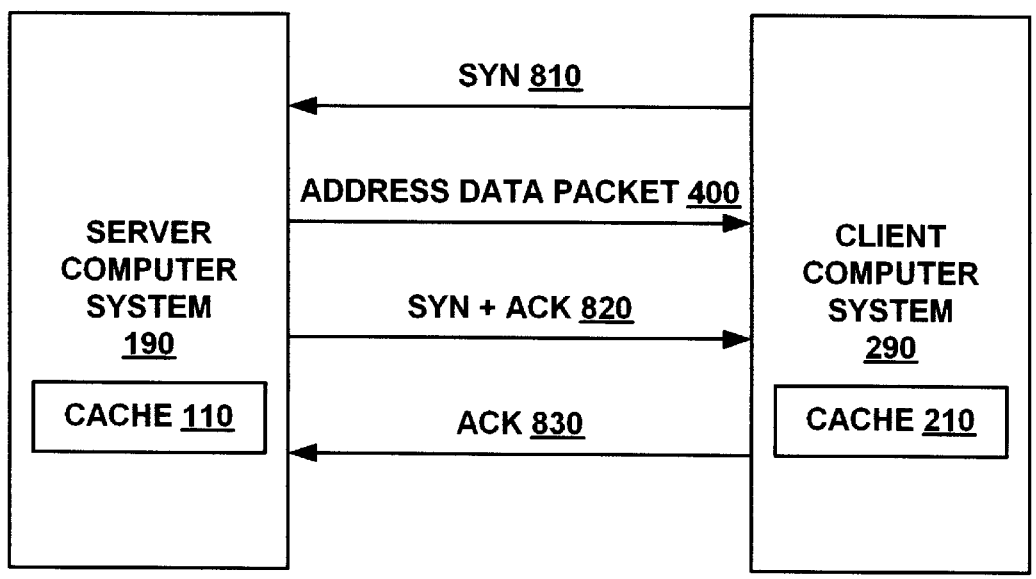
FIG. 8 is a data flow diagram showing data exchanges in a Transmission Control Protocol (TCP) transaction implementing receive load balancing in accordance with one embodiment of the present invention.

FIG. 8 is a data flow diagram showing the sequence of exchanges for implementing receive load balancing scheme 335 (FIG. 5) when a TCP (Transmission Control Protocol) connection is being established between server computer system 190 and client computer system 290. In accordance with the present invention, the protocol cache for the client computer system contains the network address and associated MAC address for the server computer system, and the protocol cache for the server computer system contains the network address and associated MAC address for the client computer system. That is, either or both of process 600 (FIG. 6A) and process 700 (FIG. 7A) have been used to load the protocol caches of server computer system 190 and client computer system 290.

Continuing with reference to FIG. 8, a synchronizing bit (e.g., SYN 810) is sent from client computer system 290 to server computer system 190 to indicate a transaction is to occur. Server computer system 190 responds with a synchronizing bit and an acknowledgment signal (e.g., SYN+ACK 820). Client computer system 290 then responds with an acknowledgment signal (e.g., ACK 830). The direction of the SYN 810, SYN+ACK 820, and ACK 830 exchanges illustrated by FIG. 8 are for a transaction initiated by client computer system 290; for a transaction initiated by server computer system 190, these exchanges are the same but occur in the direction opposite that indicated by the arrows.

Figure 9:
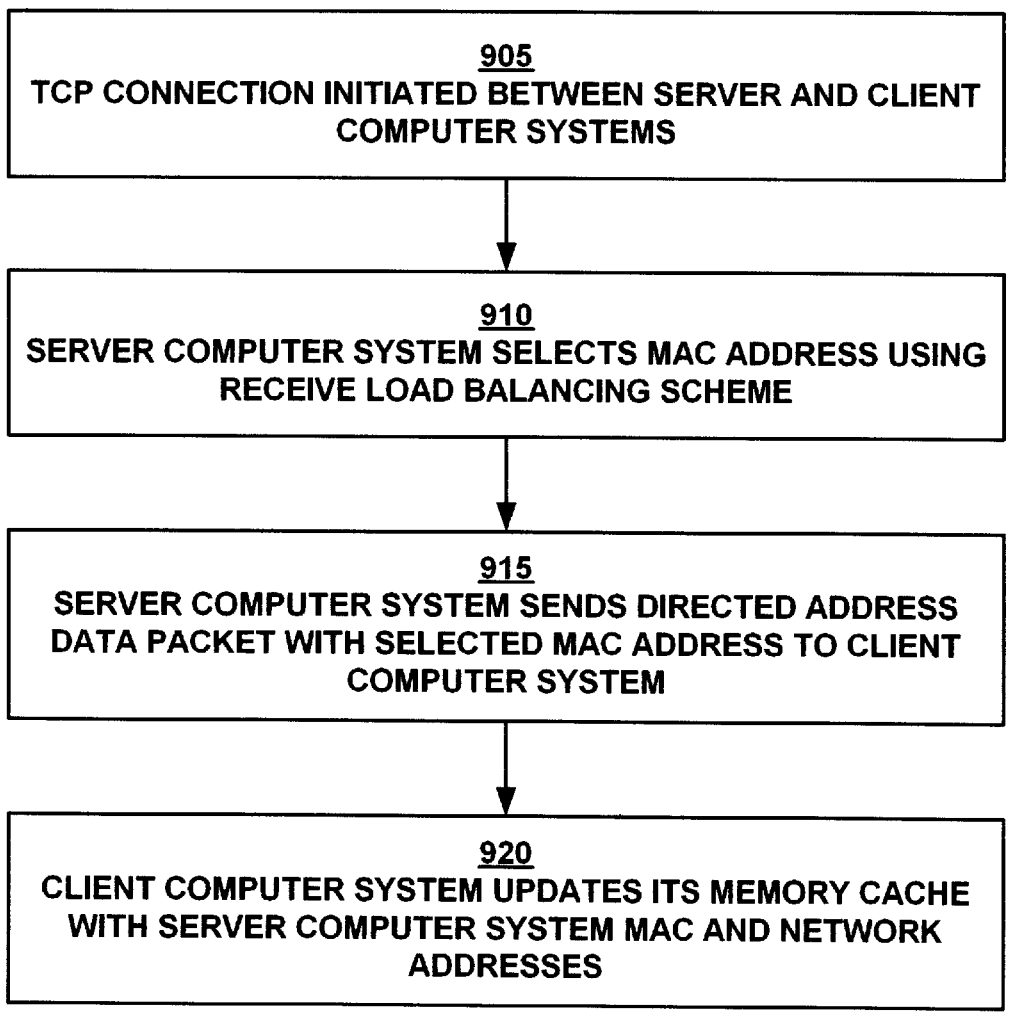
FIG. 9 is a flowchart of one embodiment of the process for implementing receive load balancing in a TCP transaction in accordance with the present invention.

FIG. 9 is a flow chart of process 900 for implementing receive load balancing scheme 335 (FIG. 5) for a TCP transaction (FIG. 8) in accordance with one embodiment of the present invention. In this embodiment, process 900 is implemented via dynamic access software element 330 (FIG. 5).

In step 905 of FIG. 9, a TCP connection is initiated between client computer system 290 (FIG. 2) and server computer system 190 (FIG. 1) as illustrated by FIG. 8.

In step 910 of FIG. 9, server computer system 190 executes receive load balancing scheme 335 to select the MAC address for one of the NICs coupled to the server computer system (e.g., one of NICs 108*a-d*). In the present embodiment, receive load balancing scheme 335 utilizes a round-robin approach to select a MAC address as described above in conjunction with FIG. 6A (step 610).

In step 915 of FIG. 9, with reference also to FIG. 8, prior to the TCP transaction occurring, server computer system 190 sends a directed address data packet (e.g., address data packet 400) to client computer system 290. In the present embodiment, the directed address data packet is a directed ARP response packet. As described above, the protocol cache of server computer system 190 (e.g., protocol cache 300*b* of FIG. 3B) contains the address information for client computer system 290, and so a directed ARP response packet can be sent that will be received only by client computer system 290. The ARP response packet contains the network address for server computer system 190 and the selected MAC address from step 910.

In one embodiment, server computer system 190 (in particular, receive load balancing scheme 335) reads the network address of the client computer system participating in the TCP transaction. If the network address (e.g., the leading bits of the network address) indicates that the client computer system is not in the same subnet as server computer system 190, then it is separated from server computer system 190 by a router. Hence, an ARP response packet would only update the memory cache of the router and not the memory cache of the client computer system. Accordingly, an ARP response packet is not sent by server computer system 190 when the network address of the client computer system indicates that the client computer system is not in the same subnet as server computer system 190.

Continuing with reference to FIGS. 8 and 9, in step 920 the MAC address provided in the directed ARP response packet for the TCP connection may be different from the MAC address already contained in protocol cache 300*a* (FIG. 3A) of client computer system 290. In any case, in accordance with the present invention, the MAC address provided by the ARP response packet replaces the MAC address already contained in protocol cache 300*a* of client computer system 290.

Thus, with every TCP transaction, protocol cache 300*a* of client computer system 290 is updated with a new MAC address for one of the NICs of server computer system 190. Hence, the present invention continues to dynamically change the NIC assigned to a particular client computer system in order to help maintain an even distribution of incoming data packets received by server computer system 190. Therefore, in accordance with the present invention, a client computer system is not permanently assigned to a particular MAC address. Instead, in the present embodiment, the MAC address assigned to a client computer system is periodically changed with each TCP transaction. Because the round-robin approach is used in the present embodiment, a relatively even distribution of MAC addresses is expected across the client computer systems in the network.

In the event of a failure of a NIC coupled to server computer system 190, process 900 is also utilized to assign the incoming data traffic associated with the failed NIC to one or more functioning NICs. Thus, the incoming data traffic remains evenly distributed over the remaining functioning NICs.

For example, in one embodiment, when a NIC fails, the traffic associated with that NIC is automatically transferred in entirety to a single NIC (e.g., the primary NIC). However, for each subsequent TCP transaction, process 900 is implemented as described above. Consequently, the incoming data traffic received by server computer system 190, in particular the traffic received by the NIC that replaced the failed NIC, will be redistributed across the remaining functioning NICs using the round-robin approach described in step 910 of FIG. 9.

Figure 10:
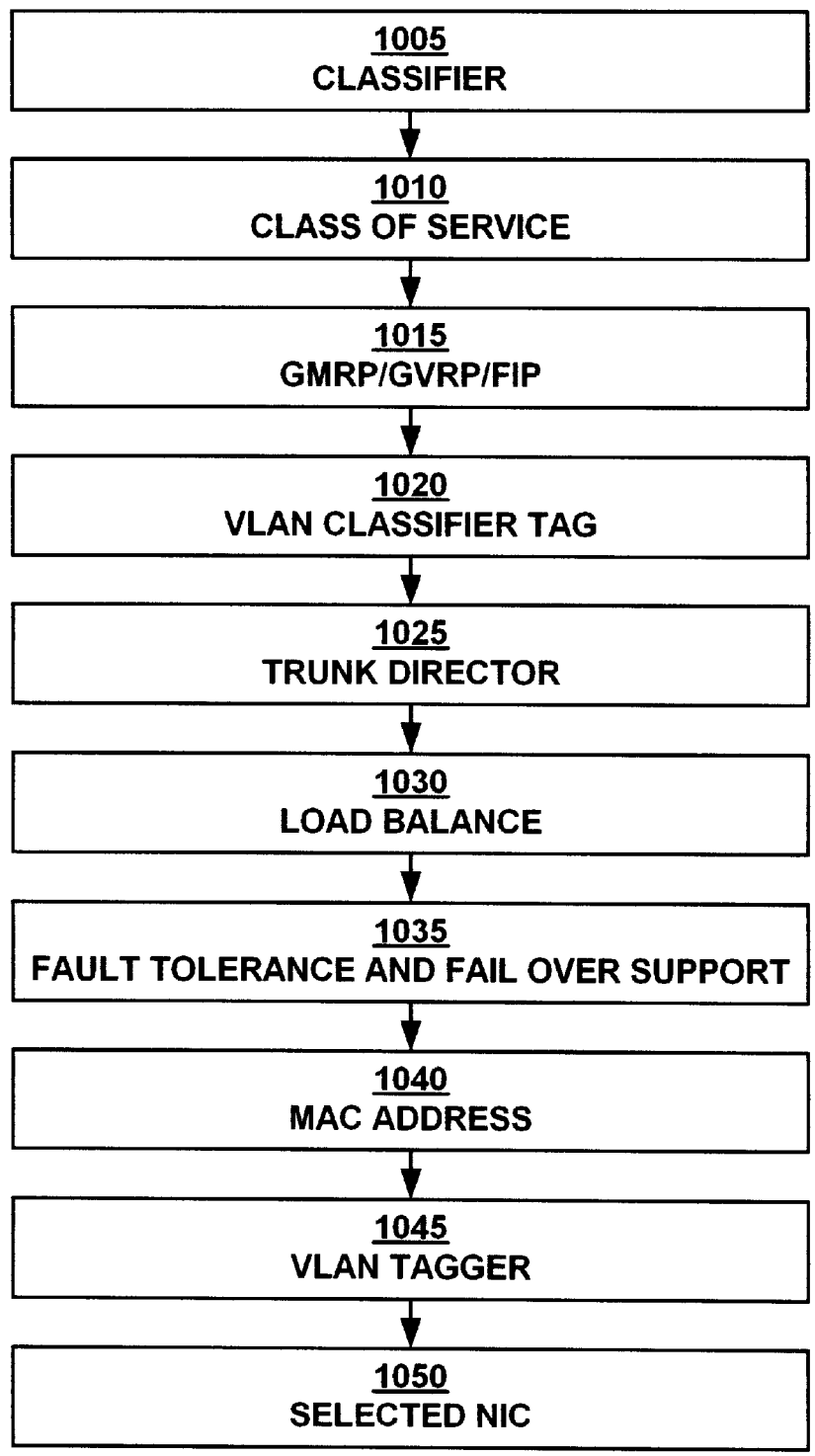
FIG. 10 is a flowchart of one embodiment of the process executed by the dynamic access software element for an outgoing data packet in accordance with the present invention.

FIG. 10 is a flowchart of one embodiment of process 1000 executed by dynamic access software element 330 in accordance with the present invention. Process 1000 includes a number of features that can be implemented by dynamic access software element 330; however, it is appreciated that in alternate embodiments a subset of these features may be used, and that in other embodiments other features (e.g., snap-ins) not described herein may be implemented.

In step 1005, dynamic access software element 330 receives a data packet from network layer 320 (FIG. 5). The outgoing data packet contains the MAC address specified by network layer 320; network layer 320 is bound to dynamic access software element 330 so the address specified by network layer 320 is actually the virtual MAC address. The operations performed by dynamic access software element 330 are transparent to network layer 320, and therefore in effect network layer 320 believes it is addressing the outgoing data packet in a normal fashion. Network layer 320 utilizes a protocol such as IP, IPX, etc. Dynamic access software element 330 classifies the outgoing data packet according to the protocol being used and indicates the pointers to all of the relevant protocol headers.

In step 1010, a class of service snap-in module can be used to prioritize the outgoing data packet according to the class of service specified by the user or network administrator. The outgoing data packet is placed in a queue according to its priority or is sent immediately through the remaining steps of process 1000. Various class of service schemes can be implemented in accordance with the present invention.

In step 1015, a snap-in module can be used to incorporate protocols being implemented by server computer system 190 (FIG. 1). These protocols include Fast IP (FIP), generic attributes registration protocol (GARP) multicast registration protocol (GMRP), and GARP VLAN registration protocol (GVRP). Various protocols can be implemented in accordance with the present invention.

In step 1020, a VLAN tag is inserted into the header of the outgoing data packet. The tag corresponds to the protocol header identified in step 1005.

In step 1025, the trunk director detects which load balance scheme is utilized in step 1030. Various load balancing schemes can be implemented in accordance with the present invention.

In step 1030, the load balance scheme utilized by dynamic access software element 330 is executed. In the present embodiment, the load balance scheme is a snap-in module, and therefore different schemes can be incorporated. The load balance scheme identifies the NIC to be used to transmit the outgoing data packet.

In step 1035, the fault tolerance and fail over support scheme utilized by dynamic access software element 330 is employed. Various fault tolerance and fail over support schemes can be implemented in accordance with the present invention. In the present embodiment, the fault tolerance module is a snap-in module. It is appreciated that the fault tolerance module does not have to be in the data stream but can perform its function in the background. The fault tolerance scheme can be utilized without load balancing. The fault tolerance and fail over support scheme is used to determine whether the NIC selected in step 1030 is functioning. The fault tolerance and fail over support scheme monitors the NICs and maintains a list of MAC addresses for NICs that are active.

Continuing with reference to step 1035 of FIG. 10, the fault tolerance and fail over support scheme dynamically adds and removes MAC addresses from the list depending on the status of each NIC. When the selected NIC is found to be non-functioning (e.g., it is not on the list), a different NIC from the list is used to replace the failed NIC. The fault tolerance and fail over support scheme also automatically transfer the functions from the failed NIC to the replacement NIC. A broadcast message (e.g., broadcast data packet 400 of FIG. 4) is then sent to the client computer systems on the network directing them to update their memory cache (e.g., protocol cache 300a of FIG. 3A) with the MAC address of the replacement NIC, and to associate that MAC address with the network address of the server computer system.

In step 1040, the true MAC address corresponding to the NIC selected in steps 1030 and 1035 is inserted into the outgoing data packet in place of the virtual MAC address initially specified by network layer 320.

In step 1045, the identifier for the destination VLAN is added to the address of the outgoing data packet per IEEE standard 802.1Q. If only one VLAN is present in the network, then the outgoing data packet passes through this step without modification.

In step 1050, the outgoing data packet is forwarded to the selected NIC (see steps 1030 and 1035), then transmitted out to and over the network.

Figure 11:
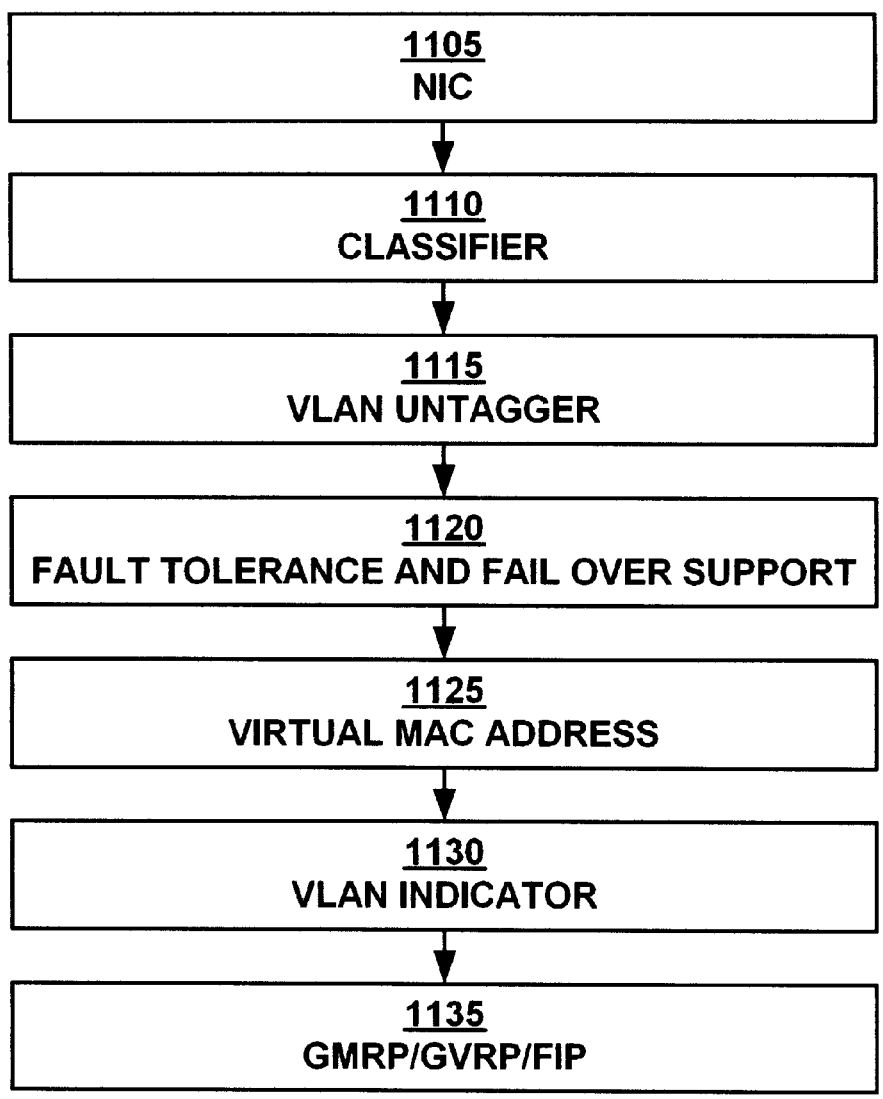
FIG. 11 is a flowchart of one embodiment of the process executed by the dynamic access software element for an incoming data packet in accordance with the present invention.

FIG. 11 is a flowchart of one embodiment of process 1100 executed by dynamic access software element 330 for an incoming data packet in accordance with the present invention. Process 1100 includes a number of features that can be implemented by dynamic access software element 330; however, it is appreciated that in alternate embodiments a subset of these features may be used, and that in other embodiments other features (e.g., snap-ins) not described herein may be implemented.

In step 1105, the incoming data packet is received at a NIC. The NIC is bound to dynamic access software element 330, so the incoming data packet is directly forwarded there.

In step 1110, the incoming data packet is classified according to the protocol being used (e.g., IP, IPX, etc.) and the VLAN it came from. The VLAN identifier is used to determine to which virtual MAC address the incoming data packet is to proceed. Because only the VLAN identifier is examined, processing of an incoming data packet is minimized. As described by step 1105, the data packet is also classified according to the protocol being used.

In step 1115, the VLAN identifier is removed from the incoming data packet if a VLAN identifier is present (refer to step 1045 of FIG. 10).

In step 1120, the fault tolerance and fail over support scheme determines whether the incoming data packet is a directed "keep-alive" data packet (see step 1035 of FIG. 10). In one embodiment, directed data packets are sent to and from the various NICs as a means for determining whether a NIC is functioning. These data packets contain no data and hence do not need to continue along the data path to network layer 320 (FIG. 5). Accordingly, the fault tolerance and fail over support scheme does not forward directed keepalive data packets. Otherwise, the data packet is forwarded through the remaining steps of process 1100.

In step 1125, the true MAC address is replaced with the virtual MAC address based on the virtual MAC address selected in step 1110. As explained above, the operations of dynamic access software element 330 are transparent to network layer 320. For example, an outgoing data packet may be sent out over one NIC and an incoming data packet received in response to the outgoing data packet may be received over a different NIC. However, network layer 320 is looking for the MAC address it used to address the outgoing data packet (see step 1005 of FIG. 10). Thus, dynamic access software element 330 provides the MAC address that network layer 320 is expecting. In this manner, a group of NICs is represented to network layer 320 as a single NIC.

In step 1130, dynamic access software element 330 determines which protocol to bind the incoming data packet to based on the classification information from step 1110.

In step 1135, the incoming data packet is examined by the GMRP, GVRP or FIP snap-in modules and treated accordingly if these protocols are being used. The incoming data packet is then forwarded to network layer 320 if appropriate (e.g., GMRP and GVRP data packets are not forwarded).

In summary, the present invention provides a system and method that balance the load of incoming data packets in a server computer system having multiple NICs when either the server computer system or the client computer system initiates a transaction. The present invention also provides a system and method that dynamically adjust the receive load balancing to help maintain an even distribution of incoming data packets across the multiple NICs over time or in the event of a NIC failure.

The preferred embodiment of the present invention, receive load balancing and fail over with multiple network interface cards, is thus described. While the present invention has been described in particular embodiments, it should be appreciated that the present invention should not be construed as limited by such embodiments, but rather construed according to the following claims.

What is claimed is:

1. In a server computer system communicatively coupled to client computer systems in a network, said server computer system adapted to have a plurality of network interface cards (NICs) coupled thereto, a method for load balancing incoming data packets, said method comprising:

sending a broadcast data packet to a first client computer system, wherein said broadcast data packet comprises an alias network address for said server computer system;

in response to said broadcast data packet, receiving from said first client computer system a directed data packet comprising a MAC address and a network address for said first client computer system;

storing said MAC address for said first client computer system in a memory cache of said server computer system;

converting said alias network address into said network address for said server computer system;

selecting a first media access control (MAC) address for a first NIC using a load balancing scheme;

sending a first directed data packet comprising said first MAC address and said network address for said server computer system to said first client computer system, wherein said first MAC address and said network address are stored in a cache memory of said first client computer system;

selecting a second MAC address for a second NIC using said load balancing scheme; and sending a second directed packet comprising said second MAC address and said network address to a second client computer system, wherein said second MAC address and said network address are stored in a cache memory of said second client computer system; said server computer system thereby receiving an incoming data packet from said first client computer system over said first NIC and from said second computer system over said second NIC.

2. The method for load balancing incoming data packets as recited in claim 1 wherein said alias network address is a Connection Steering Protocol address.

3. The method for load balancing incoming data packets as recited in claim 1 further comprising:
  initiating a transaction between said server computer system and said first client computer system;
  selecting a MAC address for one of said plurality of NICs using said load balancing scheme;
  sending a third directed data packet from said server computer system to said first client computer system, said third directed data packet containing said MAC address for said one of said plurality of NICs; and
  replacing said first MAC address with said MAC address for said one of said plurality of NICs in said cache memory of said first client computer system.

4. The method for load balancing incoming data packets as recited in claim 3 further comprising:
  reading a network address for said first client computer system; and
  not sending said first directed packet to said first client computer system when said network address indicates said first client computer system is separated from said server computer system by a router.

5. The method for load balancing incoming data packets as recited in claim 3 wherein said transaction is compliant with Transmission Control Protocol (TCP).

6. The method for load balancing incoming data packets as recited in claim 3 wherein said cache memory of said first client computer system and said cache memory of said second client system are each an Address Resolution Protocol (ARP) cache and wherein said first directed data packet, said second directed data packet and said third directed data packet are compliant with ARP.

7. The method for load balancing incoming data packets as recited in claim 1 wherein said load balancing scheme utilizes a round-robin approach comprising the steps of:
  arranging said plurality of NICs in a sequence;
  sequentially selecting a NIC; and
  repeating said sequence after each of said plurality of NICs is selected.

8. The method for load balancing incoming data packets as recited in claim 1 wherein said method is implemented using a dynamic access software element.

9. A server computer system communicatively coupled to client computer systems in a network, said server computer system comprising:
  a bus;
  a processor coupled to said bus; and
  a computer-readable memory unit coupled to said bus;
  said server computer system adapted to have a plurality of network interface cards (NICs) coupled thereto;
  said processor for performing a method for load balancing incoming data packets, said method comprising:
    sending a broadcast data packet to a first client computer system, wherein said broadcast data packet comprises an alias network address for said server computer system;
    in response to said broadcast data packet, receiving from said first client computer system a directed data packet comprising a MAC address and a network address for said first client computer system; and
    storing said MAC address for said first client computer system in a memory cache of said server computer system;
    converting said alias network address into said network address for said server computer system;
    selecting a first media access control (MAC) address for a first NIC using a load balancing scheme;
    sending a first directed data packet comprising said first MAC address and said network address for said server computer system to said first client computer system, wherein said first MAC address and said network address are stored in a cache memory of said first client computer system;
    selecting a second MAC address for a second NIC using said load balancing scheme; and
    sending a second directed packet comprising said second MAC address and said network address to a second client computer system, wherein said second MAC address and said network address are stored in a cache memory of said second client computer system, said server computer system thereby receiving an incoming data packet from said first client computer system over said first NIC and from said second computer system over said second NIC.

10. The computer system of claim 9 wherein said processor performs said method for load balancing incoming data packets wherein said alias network address is a Connection Steering Protocol address.

11. The computer system of claim 9 wherein said processor performs said method for load balancing incoming data packets further comprising:
  initiating a transaction between said server computer system and said first client computer system;
  selecting a MAC address for one of said plurality of NICs using said load balancing scheme;
  sending a third directed data packet from said server computer system to said first client computer system, said third directed data packet containing said MAC address for said one of said plurality of NICs; and
  replacing said first MAC address with said MAC address for said one of said plurality of NICs in said cache memory of said first client computer system.

12. The computer system of claim 11 wherein said processor performs said method for load balancing incoming data packets wherein said transaction is compliant with Transmission Control Protocol (TCP).

13. The computer system of claim 11 wherein said processor performs said method for load balancing incoming data packets wherein said cache memory of said first client computer system and said cache memory of said second client system are each an Address Resolution Protocol (ARP) cache and wherein said first directed data packet, said second directed data packet and said third directed data packet are compliant with ARP.

14. The computer system of claim 11 wherein said processor performs said method for load balancing incoming data packets further comprising:
  reading a network address for said first client computer system; and
  not sending said first directed packet to said first client computer system when said network address indicates said first client computer system is separated from said server computer system by a router.

15. The computer system of claim 9 wherein said processor performs said method for load balancing incoming data packets further comprising:
  arranging said plurality of NICs in a sequence;
  sequentially selecting a NIC; and
  repeating said sequence after each of said plurality of NICs is selected.

16. The computer system of claim 9 wherein said processor performs said method for load balancing incoming data packets wherein said method is implemented using a dynamic access software element.

17. A computer-usable medium having computer readable program code embodied therein for causing a server computer system adapted to have a plurality of network interface cards (NICs) coupled thereto to perform the steps of:

sending a broadcast data packet to a first client computer system, wherein said broadcast data packet comprises an alias network address for said server computer system;

in response to said broadcast data packet, receiving from said first client computer system a directed data packet comprising a MAC address and a network address for said first client computer system; and storing said MAC address for said first client computer system in a memory cache of said server computer system;

converting said alias network address into said network address for said server computer system;

selecting a first media access control (MAC) address for a first NIC using a load balancing scheme;

sending a first directed data packet comprising said first MAC address and said network address for said server computer system to said first client computer system;

storing said first MAC address and said network address in a cache memory of said first client computer system;

selecting a second MAC address for a second NIC using said load balancing scheme;

sending a second directed packet comprising said second MAC address and said network address to a second client computer system; and storing said second MAC address and said network address in a cache memory of said second client computer system, said server computer system thereby receiving an incoming data packet from said first client computer system over said first NIC and from said second computer system over said second NIC.

18. The computer-usable medium of claim 17 wherein said alias network address is a Connection Steering Protocol address.

19. The computer-usable medium of claim 17 wherein said computer-readable program code embodied therein causes a server computer system to perform the steps of:

initiating a transaction between said server computer system and said first client computer system;

selecting a MAC address for one of said plurality of NICs using said load balancing scheme;

sending a third directed data packet from said server computer system to said first client computer system, said third directed data packet containing said MAC address for said one of said plurality of NICs; and replacing said first MAC address with said MAC address for said one of said plurality of NICs in said cache memory of said first client computer system.

20. The computer-usable medium of claim 19 wherein said computer-readable program code embodied therein causes a server computer system to perform the steps of:

reading a network address for said first client computer system; and not sending said first directed packet to said first client computer system when said network address indicates said first client computer system is separated from said server computer system by a router.

21. The computer-usable medium of claim 19 wherein said transaction is compliant with Transmission Control Protocol (TCP).

22. The computer-usable medium of claim 19 wherein said processor performs said method for load balancing incoming data packets wherein said cache memory of said first client computer system and said cache memory of said second client system are each an Address Resolution Protocol (ARP) cache and wherein said first directed data packet, said second directed data packet and said third directed data packet are compliant with ARP.

23. The computer-usable medium of claim 17 wherein said computer-readable program code embodied therein causes a server computer system to perform the steps of:

arranging said plurality of NICs in a sequence;

sequentially selecting a NIC; and repeating said sequence after each of said plurality of NICs is selected.

\* \* \* \* \*